R. SCHÖNNER.
SEED SOWER.
APPLICATION FILED SEPT. 30, 1909.

957,577.

Patented May 10, 1910.

WITNESSES
W. P. Burke
A. F. Heuman

INVENTOR
Rudolf Schönner

UNITED STATES PATENT OFFICE.

RUDOLF SCHÖNNER, OF BERLIN, GERMANY.

SEED-SOWER.

957,577. Specification of Letters Patent. Patented May 10, 1910.

Application filed September 30, 1909. Serial No. 520,355.

*To all whom it may concern:*

Be it known that I, RUDOLF SCHÖNNER, a subject of the German Emperor, and residing at Berlin, Germany, have invented a certain new and useful Improvement in Seed-Sowers for Sowing Corn and Like Agricultural Seeds, of which the following is a specification.

My invention relates to improved apparatus for sowing corn and the like agricultural seeds.

It is a well-known fact that the yield of agricultural crops can be increased very considerably by replanting the plants or planting them deeper in the ground when they have reached a certain stage of growth. Under present conditions, however, and especially when farming on a large scale it is practically impossible to treat each plant separately in the manner stated. It has consequently been proposed to cover the plants with earth when they have reached a certain stage of growth, namely when they have developed their second leaf. This procedure gives a considerable increase in the yield.

Now a primary object of my invention is to provide an improved apparatus for covering the plants with earth, when they have reached a certain stage of growth, in such a manner as to allow of doing this on a large scale with economy.

My improved apparatus consists substantially of a seed drill of any usual construction in which a wheel or disk is arranged in front of each drill tube behind a share or colter adapted to open the ground in front of said wheel or disk. This wheel or disk forms a deep furrow with a ridge of earth on each side of it, and the seed is sown in the deepest part of the furrow by the drill tube situated behind the wheel or disk.

One form of my improved apparatus is illustrated by way of example in the accompanying drawings in which:—

Figure 1:
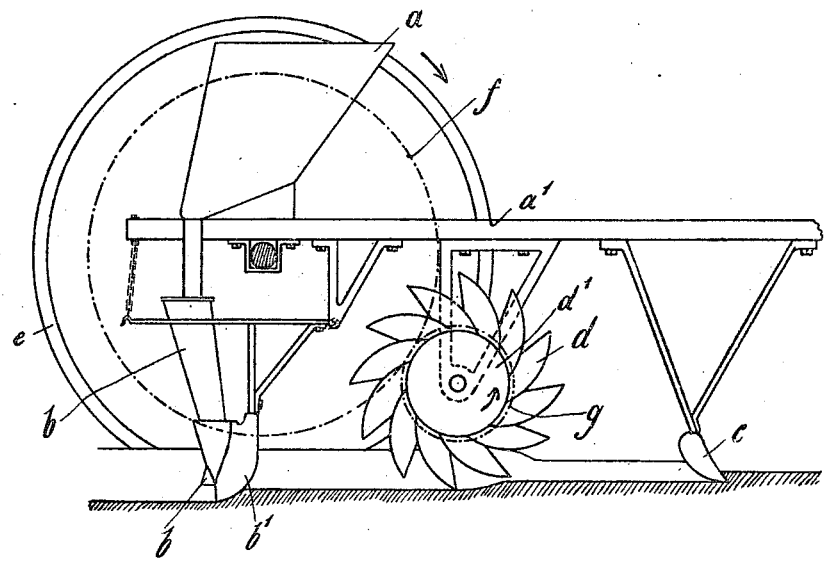
Figure 2:
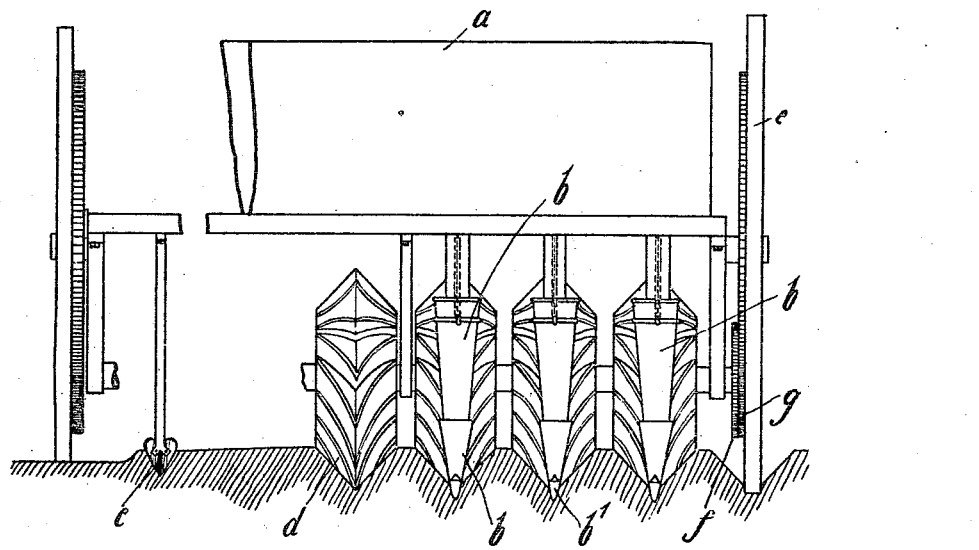

Figure 1 is a side elevation of a seed drill embodying the improvements according to my invention, and Fig. 2 is a partial rear elevation of the same.

Referring to the drawing, $a$ is the seed box mounted on the framing $a'$ of the machine; from it extend the usual drill tubes $b$, which are provided in front with the usual small shares or colters $b'$.

The devices for adjusting and operating the drill are of the usual kind, and are therefore not shown in the drawings.

$c$ are small shares fixed to the framing of the drill one in front of each drill tube. These front shares $c$ are designed to make a comparatively shallow furrow; they have the function of breaking up the hard outer crust of soil and prepare the ground for the operation of the wheels $d$ now to be described. These wheels $d$ are mounted in the frame of the drill one in front of each drill tube, and each wheel runs in the furrow that has been opened by the corresponding front share $c$. The wheels $d$ may be composed of a number of bodies having the form of small plowshares arranged around a central hub $d'$ as clearly shown in the drawings. In the form shown the wheels $d$ are designed to rotate in the opposite direction to the land wheels $e$ of the drill, so that their shares dig up the soil, and lift it and then let it run down at both sides of the wheel so as to form a furrow having a ridge of soil on each side of it, as shown in Fig. 2. The drill tubes $b$ must then be extended down sufficiently to be able to work in the bottom of the furrow, that is to say, they must go deeper than the wheels $d$, so that the seed shall be drilled into the deepest part of the furrow. The sown seed is then covered with soil in the usual manner by means of the usual appliances, such as rollers, harrows, etc.

When the seed has sprouted and the plants are showing the second or third leaf, they are then covered with earth by any convenient means, such as by working smoothing scrapers or harrows across the the furrows. A more exact procedure is to work hoeing machines or smoothing machines with disk wheels along the furrows so as to scrape or push the earth from the ridges into the furrows. The subsequent treatment of the plants may be carried out in the usual manner.

I claim:—

1. In a machine for sowing corn and like seeds, the combination, with a seed drill comprising a frame, drill tubes thereon, and a share or colter on said frame in front of each of said tubes, of a rotatable wheel or disk adapted to form a deep furrow having a ridge of soil on each side thereof arranged between each of said tubes and the share or colter in front of the same, and means for rotating said wheel in such a manner that the portion thereof which forms the furrow will move in the same direction as that in which the machine moves.

2. In a machine for sowing corn and like seeds, the combination, with a seed drill comprising a frame, drill tubes thereon, land wheels carrying said frame, and a share or colter on said frame in front of each of said tubes, of a wheel comprising a hub carrying share-like bodies adapted to form a deep furrow having a ridge of soil on each side thereof arranged between each of said tubes and the share or colter in front of the same and gearing connecting said land wheels with the furrow-forming wheels, the latter being rotated in a direction opposite to the direction of rotation of the land wheels.

In testimony whereof, I affix my signature in the presence of two witnesses.

RUDOLF SCHÖNNER.

Witnesses:
WOLDEMAR HAUPT,
HENRY HASPER.